(12) United States Patent
Puzicha et al.

(10) Patent No.: US 9,460,164 B2
(45) Date of Patent: Oct. 4, 2016

(54) APPARATUS AND METHOD FOR SINGLE ACTION APPROVAL OF LEGALLY CATEGORIZED DOCUMENTS

(71) Applicants: Jan Puzicha, Bonn (DE); Robert Tennant, San Francisco, CA (US)

(72) Inventors: Jan Puzicha, Bonn (DE); Robert Tennant, San Francisco, CA (US)

(73) Assignee: Recommind, Inc., San Francisco, CA (US)

( * ) Notice: Subject to any disclaimer, the term of this patent is extended or adjusted under 35 U.S.C. 154(b) by 338 days.

(21) Appl. No.: 13/973,920

(22) Filed: Aug. 22, 2013

(65) Prior Publication Data

US 2014/0012837 A1    Jan. 9, 2014

Related U.S. Application Data

(63) Continuation of application No. 11/627,911, filed on Jan. 26, 2007.

(51) Int. Cl.
*G06F 17/30* (2006.01)

(52) U.S. Cl.
CPC ... *G06F 17/30554* (2013.01); *G06F 17/30705* (2013.01)

(58) Field of Classification Search
CPC ............... G06F 17/30554; G06F 17/30705
See application file for complete search history.

(56) References Cited

U.S. PATENT DOCUMENTS

| | | |
|---|---|---|
| 6,502,081 B1 | 12/2002 | Wiltshire, Jr. et al. |
| 7,058,661 B2 | 6/2006 | Ciaramitaro et al. |
| 7,089,238 B1 | 8/2006 | Davis et al. |
| 7,567,961 B2 | 7/2009 | Yang-Stephens et al. |
| 2002/0095378 A1 | 7/2002 | Cauchon et al. |
| 2002/0123902 A1 | 9/2002 | Lenore et al. |
| 2005/0240578 A1 | 10/2005 | Biederman, Sr. et al. |
| 2006/0085469 A1 | 4/2006 | Pfeiffer et al. |
| 2008/0082352 A1* | 4/2008 | Schmidtler ............ G06Q 10/10 705/2 |
| 2008/0104118 A1 | 5/2008 | Pulfer et al. |

OTHER PUBLICATIONS

Non-Final, Oct. 29, 2008, U.S. Appl. No. 11/627,911, filed Jan. 26, 2007.
Final, May 12, 2009, U.S. Appl. No. 11/627,911, filed Jan. 26, 2007.
Non-Final, Sep. 15, 2009, U.S. Appl. No. 11/627,911, filed Jan. 26, 2007.
Final, Mar. 2, 2010, U.S. Appl. No. 11/627,911, filed Jan. 26, 2007.
Non-Final, Nov. 8, 2010, U.S. Appl. No. 11/627,911, filed Jan. 26, 2007.
Final, Apr. 27, 2011, U.S. Appl. No. 11/627,911, filed Jan. 26, 2007.
Non-Final, Dec. 28, 2011, U.S. Appl. No. 11/627,911, filed Jan. 26, 2007.
Non-Final, Sep. 20, 2012, U.S. Appl. No. 11/627,911, filed Jan. 26, 2007.
Non-Final, Nov. 18, 2013, U.S. Appl. No. 11/627,911, filed Jan. 26, 2007.
Non-Final Office Action, Feb. 6, 2015, U.S. Appl. No. 11/627,911, filed Jan. 26, 2007.
Final, May 2, 2014, U.S. Appl. No. 11/627,911, filed Jan. 26, 2007.

* cited by examiner

*Primary Examiner* — Huawen A Peng
(74) *Attorney, Agent, or Firm* — Carr & Ferrell LLP

(57) ABSTRACT

A computer readable storage medium includes executable instructions to display a document with legal categorizations. The legal categorizations are accepted and invoke a subsequent document for viewing with a single input action. The subsequent document is displayed. Revised legal categorizations are received. The revised legal categorizations are accepted and invoke an additional document for viewing with a single input action.

21 Claims, 5 Drawing Sheets

APPARATUS AND METHOD FOR SINGLE ACTION APPROVAL OF LEGALLY CATEGORIZED DOCUMENTS

CROSS-REFERENCE TO RELATED APPLICATIONS

This application is a continuation of, and claims the benefit of and priority to, U.S. patent application Ser. No. 11/627,911, filed on Jan. 26, 2007, entitled "Apparatus and Method for Single Action Approval of Legally Categorized Documents", the contents of which are incorporated herein.

BRIEF DESCRIPTION OF THE INVENTION

This invention relates generally to the processing of documents, such as in the production of documents in connection with a lawsuit. More particularly, this invention relates to an automated technique to accelerate the review and approval of such documents through single action computer input.

BACKGROUND OF THE INVENTION

During litigation, parties exchange documents relevant to the litigation. However, some documents may be withheld if they meet certain criteria, such as if the document is covered by the attorney-client privilege or if the document is attorney work product. Documents that are irrelevant to the litigation are also commonly withheld from production. The review and categorization of documents in the course of a litigation is a labor intensive exercise. It would be desirable to simplify the review and categorization of such documents.

SUMMARY OF THE INVENTION

A computer readable storage medium includes executable instructions to display a document with legal categorizations. The legal categorizations are accepted and invoke a subsequent document for viewing with a single input action. The subsequent document is displayed. Revised legal categorizations are received. The revised legal categorizations are accepted and invoke an additional document for viewing with a single input action.

The invention provides a technique to simplify and accelerate the review and categorization of documents. Thus, the invention reduces costs associated with litigation.

BRIEF DESCRIPTION OF THE FIGURES

The invention is more fully appreciated in connection with the following detailed description taken in conjunction with the accompanying drawings, in which:

FIG. 3 illustrates a graphical user interface that may be used to facilitate pre-processing of documents in accordance with an embodiment of the invention.

FIG. 4 illustrates a graphical user interface with coding information utilized in accordance with an embodiment of the invention.

DETAILED DESCRIPTION OF THE INVENTION

Figure 1:
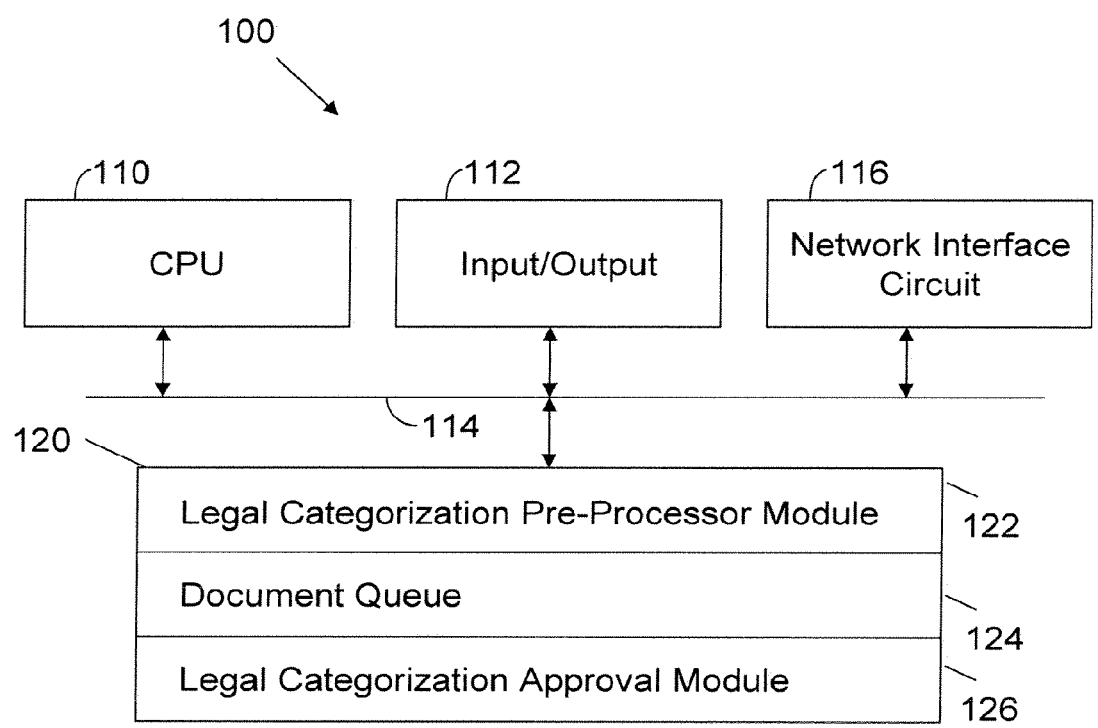
FIG. 1 illustrates a computer configured in accordance with an embodiment of the invention.

FIG. 1 illustrates a computer 100 configured in accordance with an embodiment of the invention. The computer 100 includes standard components, such as a central processing unit 110, which communicates with a set of input and output devices 112 via a bus 114. The input and output devices 112 may include a keyboard, mouse, touch pad, display, monitor, printer, and the like. A network interface circuit 116 is also attached to the bus 114 to facilitate interconnectivity with a network (not shown).

A memory 120 is also connected to the bus 114. The memory includes executable instructions to implement operations associated with the invention. A legal categorization pre-processor module 122 includes executable instructions to analyze a set of documents in accordance with specified legal criteria and thereby produce a set of documents with associated legal categorizations that are inserted into a document queue 124. A legal categorization approval module 126 includes executable instructions to accept the legal categorizations associated with a document and invoke a subsequent document for viewing with a single input action (e.g., a single click of a mouse, a single tap on a touch screen, etc.).

Figure 2:
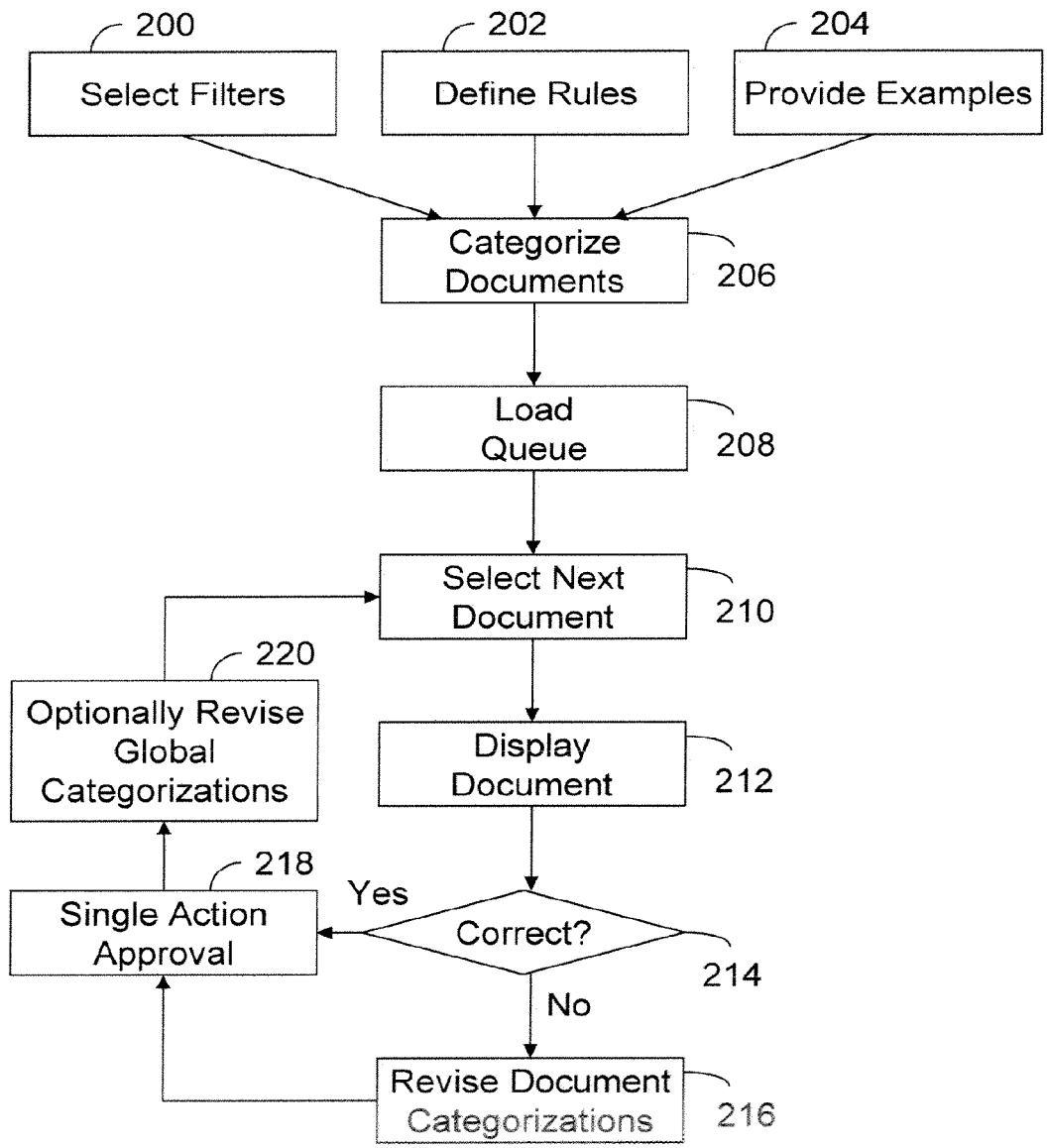
FIG. 2 illustrates processing operations associated with an embodiment of the invention.

FIG. 2 illustrates processing operations associated with an embodiment of the invention. The legal categorization pre-processor module 122 may be used to implement the operations 200-208 of FIG. 2. Individual documents within a set of documents may be isolated through the selection of filters 200, defining rules 202 and/or providing example documents 204 consistent with the legal categorization. This information is processed to initially categorize documents 206. As each document is categorized, it is loaded into a queue 208. Commonly coded documents may be placed adjacent to one another in the queue to facilitate the review of common documents. Once the queue is loaded, the documents may be processed, for example, using the legal categorization approval module 126.

The legal categorization approval module 126 includes executable instructions to implement the operations 210 through 220 of FIG. 2. In each cycle the next document in the queue is selected 210. The document is then displayed 212. If the initial categorizations within the document (e.g., those provided by the legal categorization pre-processor module 122) are accurate (block 214—Correct—Yes), then single action approval 218 results in acceptance of the categorization and the invocation of the next document in the queue 210. Prior to selecting the next document, global categorizations may be revised 220. That is, the legal categorization approval module 126 may include executable instructions to refine the initial categorizations based upon ongoing input from the user. The initial categorization criteria and/or the ongoing input from the user may be used to supply a confidence level for any given legal categorization. If the initial categorizations within the document are not accurate (block 214—Correct—No), the user may revise the document categorizations 216. Thereafter, single action approval 218 results in the selection of the next document 210. Optionally, global categorizations may be revised 220 based upon user input.

Figure 3:
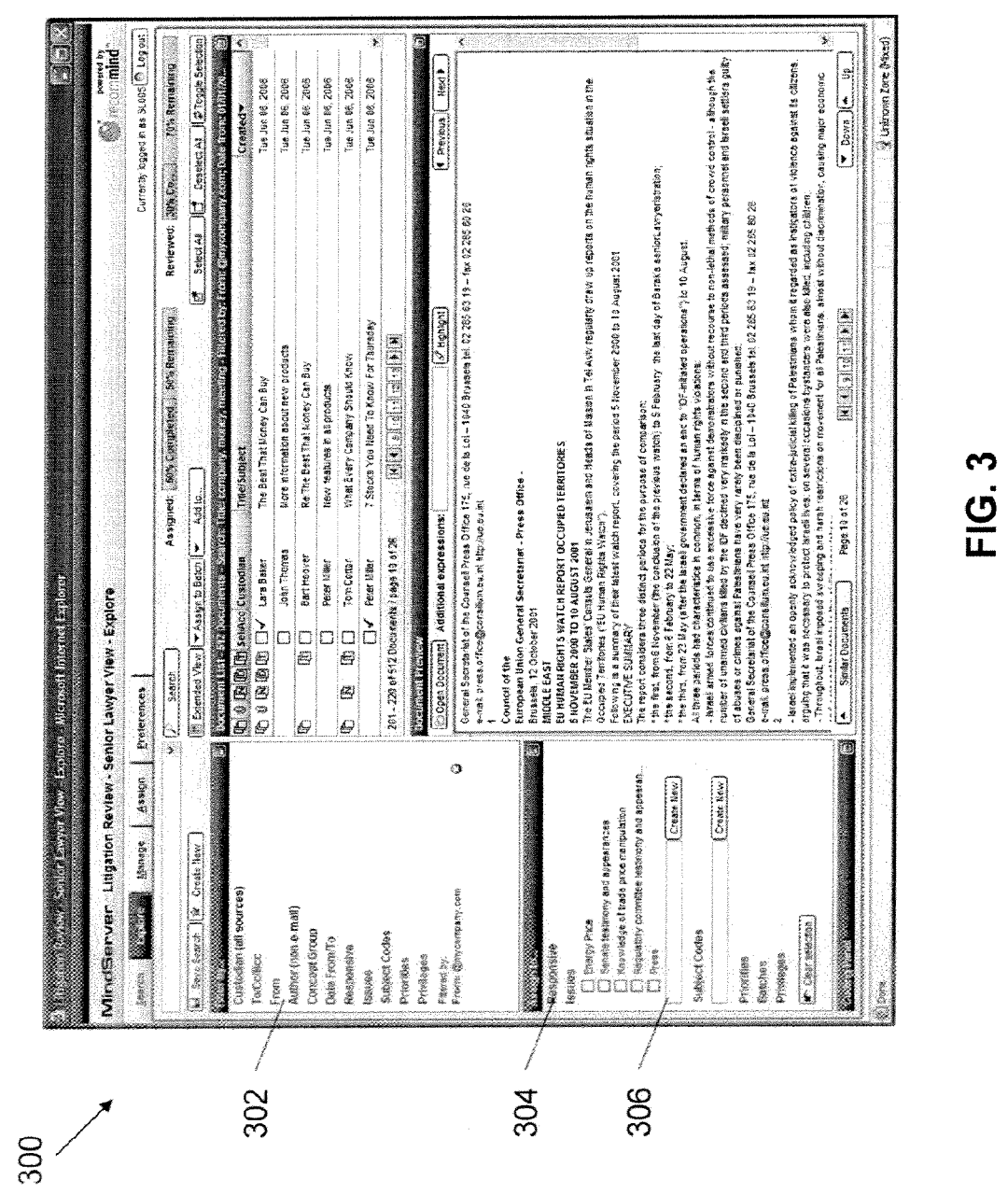

FIG. 3 illustrates a graphical user interface (GUI) 300 that may be used to support operations associated with the invention. The GUI 300 includes a filter pane 302, which lists a number of filters that may be used to categorize documents. In this example, available filters include filters based upon such criteria as email addresses (e.g., "To: CC: BCC", "From") non-email authors, concept groups, responsiveness, issues, subject codes, priorities and privileges. The GUI 300 also includes selectable issues in pane 304, which may be assigned to documents. The pane 304 includes a box 306, which allows one to specify new issues for document categorization, Thus, the GUI 300 may be used to collect information that is utilized by the legal categorization preprocessor module 122.

Figure 4:
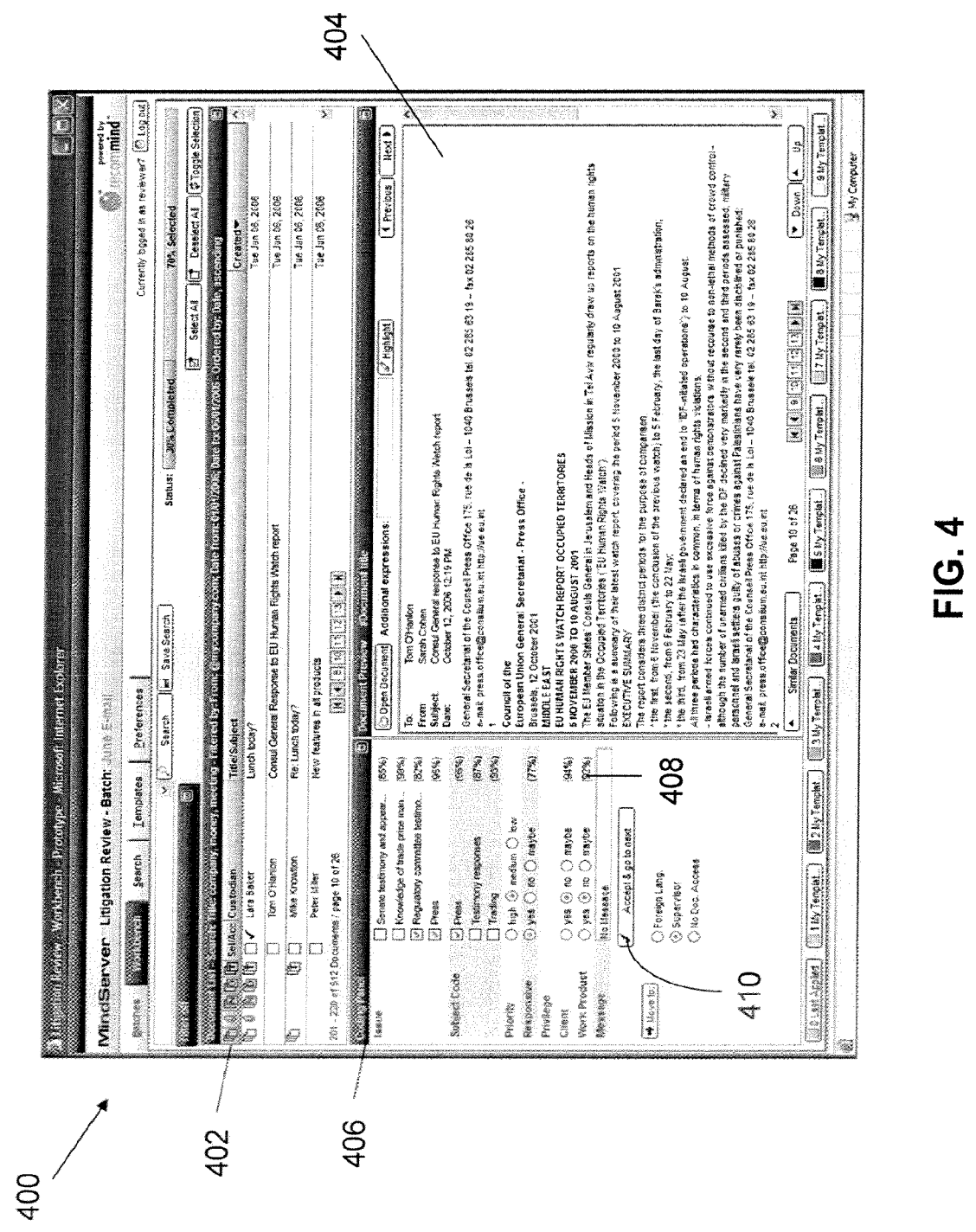

FIG. 4 illustrates a GUI 400 that may be used to support single action approval in accordance with an embodiment of the invention. The GUI 400 includes a block 402 to display a list of queued documents. Pane 404 displays a document to be reviewed. Pane 406 (also referred to as coding panel 406) displays coding or legal categorizations associated with the document in pane 404 (also referred to as document 404). In this example, the legal categorizations include specified issues, subjects, priority, responsiveness, attorney-client privilege and attorney work product. In an embodiment of the invention, a confidence level 408 is associated with each legal categorization. The legal categorization pre-processor module 122 may be used to supply the legal categorizations while the legal categorization approval module 126 may be used to update codes and confidence levels based upon user input. In one embodiment of the invention, clicking on a confidence level 408 results in highlighting of relevant portions within the document 404, which are associated with the confidence level, thereby allowing the user to understand the bases for a categorization.

FIG. 4 also illustrates a single action approval button 410. This button allows a user to accept the presented legal categorizations and invoke a subsequent document. Thus, with a single computer input action, a user may endorse legal categorizations and invoke a subsequent document. This streamlined approach saves time and effort in the event that no changes are necessary. Even if changes are necessary, a user may modify the coding panel 406 and thereafter press the single action approval button 410. The pre-populated legal categorizations allow for accelerated processing even when coding information needs to be changed.

Figure 5:
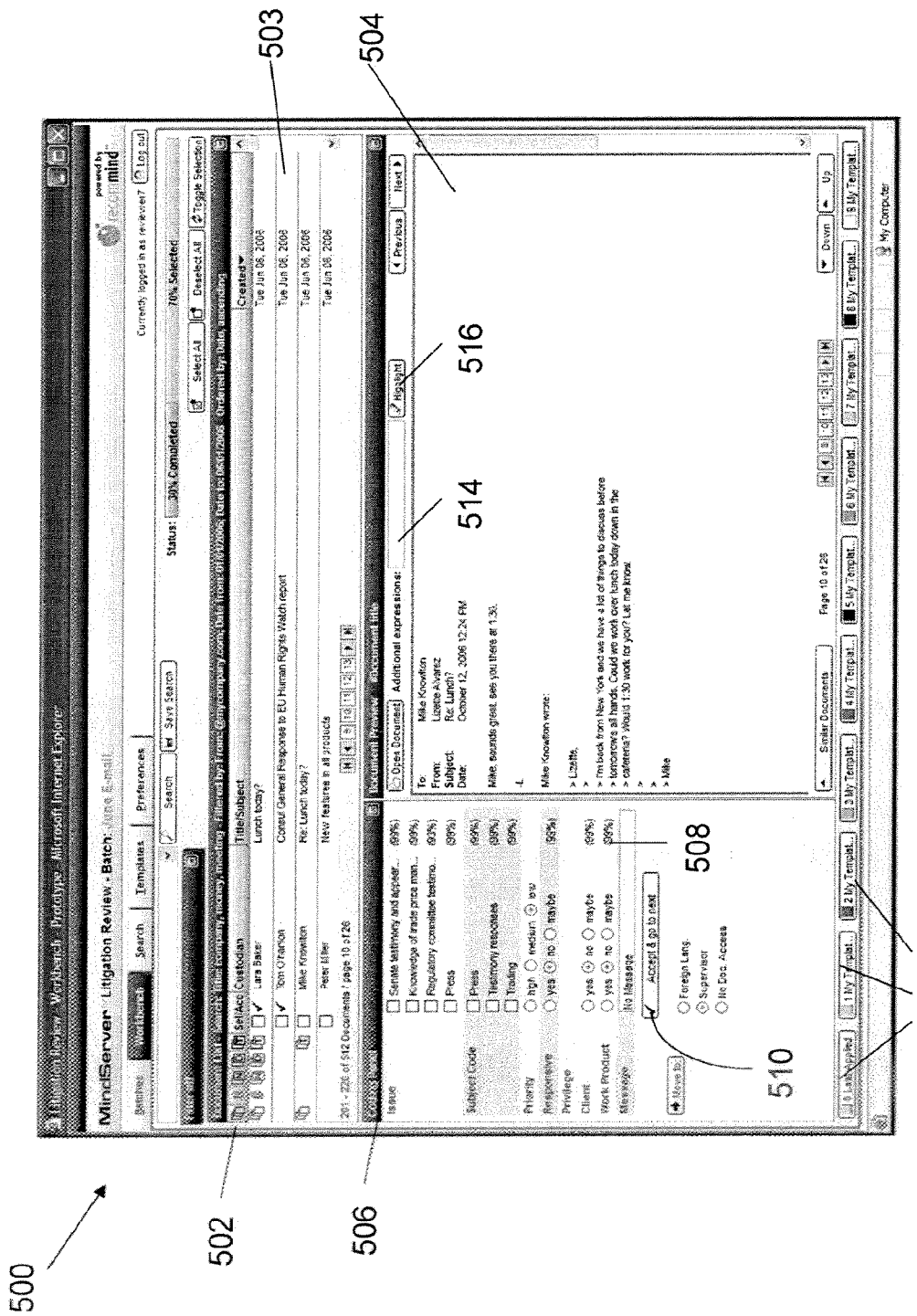
FIG. 5 illustrates a graphical user interface with coding information utilized in accordance with an embodiment of the invention. Like reference numerals refer to corresponding parts throughout the several views of the drawings.

FIG. 5 illustrates a GUI 500 that displays the queued document following the document displayed in FIG. 4. The GUI 500 includes a panel 502 to display queued documents. Observe here that processed documents are marked by a check, including the email 503, which was processed in FIG. 4. Pane 504 illustrates the current document. Pane 506 includes different coding information associated with the document in pane 504. The displayed coding information has associated con1ldence values 508. A single action approval button 510 is also shown in FIG. 5.

FIG. 5 also illustrates template buttons 512 which may be assigned to a document. For example, each template button 512 may have a pre-populated coding schema that may be applied to a document by simply clicking on the template button 512. FIG. 5 also illustrates additional features associated with embodiments of the invention, such as an expressions block 514 for document annotation and a highlighting tool 516 to facilitate user highlighting of a document.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium having embodied thereon a program, the program being executable by a processor to perform a method to view documents with legal categories, the method comprising:

providing example documents representative of specified legal criteria defining a legal category;

categorizing documents based on the specified legal criteria exemplified by the example documents;

assigning confidence levels to legal categorizations of at least one of the categorized documents;

loading categorized documents consistent with the legal category into a queue;

assigning template buttons to the categorized documents, the template buttons having a pre-populated coding schema;

transmitting to display a categorized document from the queue; and in response to a single input action, accepting one or more classifications associated with the legal category of the categorized document and with the single input action invoking a subsequent categorized document from the queue for viewing.

2. The non-transitory computer readable storage medium of claim 1, wherein the specified legal criteria is responsiveness.

3. The non-transitory computer readable storage medium of claim 1, wherein the specified legal criteria is attorney-client privilege.

4. The non-transitory computer readable storage medium of claim 1, wherein the specified legal criteria is attorney work product.

5. The non-transitory computer readable storage medium of claim 1, wherein the specified legal criteria is an identified issue.

6. The non-transitory computer readable storage medium of claim 1, wherein the specified legal criteria is an identified subject.

7. The non-transitory computer readable storage medium of claim 1, wherein the method further comprises displaying highlighted document text associated with the confidence levels.

8. The non-transitory computer readable storage medium of claim 1, wherein the step of, in response to a single input action, accepting one or more classifications associated with the legal category of the categorized document and with the single input action invoking a subsequent categorized document from the queue for viewing further comprises defining a graphical user interface button to facilitate the single input action.

9. The non-transitory computer readable storage medium of claim 1, the method further comprising refining the legal category based on ongoing user data input.

10. The non-transitory computer readable storage medium of claim 1, wherein the step of loading categorized documents consistent with the legal category into a queue further comprises loading commonly categorized documents adjacent to one another in the queue.

11. The non-transitory computer readable storage medium of claim 1, wherein the confidence levels are assigned based on the specified legal criteria.

12. The non-transitory computer readable storage medium of claim 1, wherein the confidence levels are assigned based on a user input.

13. A method for viewing documents with legal categories via a computer having instructions stored in memory, the method comprising:
   executing instructions stored in memory by a processor to:
      provide example documents representative of specified legal criteria defining a legal category;
      categorize documents based on the specified legal criteria exemplified by the example documents;
      assign confidence levels to legal categorizations of at least one of the categorized documents;
      assign template buttons to the categorized documents, the template buttons having a pre-populated coding schema;
      load categorized documents consistent with the legal category into a queue;
      transmit to display a categorized document from the queue; and
      in response to a single input action, accept one or more classifications associated with the legal category of the categorized document and with the single input action invoke a subsequent categorized document from the queue for viewing.

14. The method of claim 13, wherein the specified legal criteria is responsiveness, attorney-client privilege, attorney work product, identified issue, identified subject, or any combination thereof.

15. The method of claim 13, further comprising displaying highlighted document text associated with the confidence levels.

16. The method of claim 13, wherein the step of, in response to a single input action, accepting one or more classifications associated with the legal category of the categorized document and with the single input action invoking a subsequent categorized document from the queue for viewing further comprises defining a graphical user interface button to facilitate the single input action.

17. The method of claim 13, further comprising refining the legal category based on ongoing user data input.

18. The method of claim 13, wherein the step of executing instructions stored in memory to load categorized documents consistent with the legal category into a queue further comprises loading commonly categorized documents adjacent to one another in the queue.

19. A system for displaying documents with legal categories, the system comprising:
   a memory configured to store documents; and
   a processor configured to execute instructions stored in memory to:
      provide example documents representative of specified legal criteria defining a legal category;
      categorize documents based on the specified legal criteria exemplified by the example documents;
      assign confidence levels to legal categorizations of at least one of the categorized documents;
      assign template buttons to the categorized documents, the template buttons having a pre-populated coding schema;
      load categorized documents consistent with the legal category into a queue;
      transmit to display a categorized document from the queue; and
      in response to a single input action, accept one or more classifications associated with the legal category of the categorized document and with the single input action invoke a subsequent categorized document from the queue for viewing.

20. The system of claim 19, wherein the specified legal criteria is responsiveness, attorney-client privilege, attorney work product, identified issue, identified subject, or any combination thereof.

21. The system of claim 19, wherein the step of loading categorized documents consistent with the legal category into a queue further comprises loading commonly categorized documents adjacent to one another in the queue.

* * * * *